Figures 1, 2:
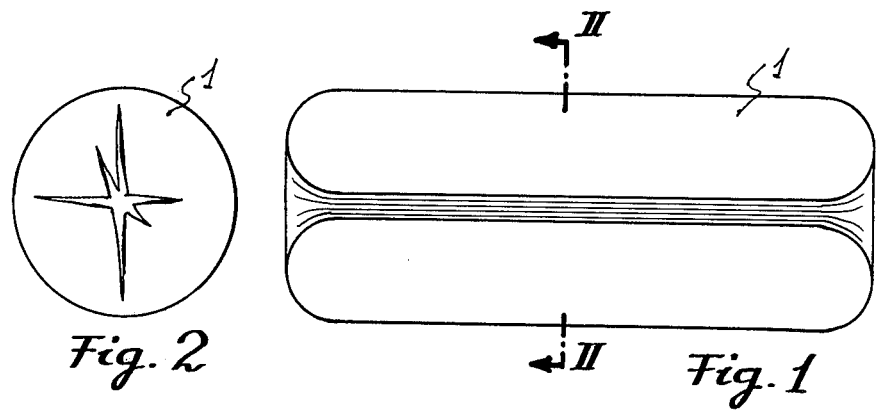

United States Patent [19]

Alcalde Pecero

[11] 4,036,254

[45] July 19, 1977

[54] CONTAINER THAT CAN BE DISPLACED BY ROTARY FORCE

[76] Inventor: Francisco Alcalde Pecero, Santa Clara No. 40, Seville, Spain

[21] Appl. No.: 608,108

[22] Filed: Aug. 27, 1975

[30] Foreign Application Priority Data

Jan. 29, 1975 Spain .................................... 434253

[51] Int. Cl.$^2$ ............................................. E03B 11/00
[52] U.S. Cl. ........................................ 137/581; 137/1; 206/303; 150/DIG. 1; 15/104.06 R; 166/192
[58] Field of Search .................... 137/581, 1; 206/303; 166/179, 192, 153; 150/DIG. 1; 15/104.06

[56] References Cited

U.S. PATENT DOCUMENTS 2,941,537   6/1960   Watkins ................................... 137/1

Primary Examiner—Martin P. Schwadron
Assistant Examiner—H. Jay Spiegel
Attorney, Agent, or Firm—Eric Y. Munson

[57] ABSTRACT

The present invention relates to a new container that can be displaced by rotary force, consisting of a continuous sheet that assumes a form similar to a cylindrical surface, generated by a rectangle whose shorter sides have been substituted by convex semicircumferences, when it rotates around an axis that is very close and parallel to one of the long sides. An element is then placed in the direction of the axis and forms the axis of rotation. This element is held fast by the container when the latter is filled with fluid or other matter that induces multidirectional pressures of sufficient magnitude to cause the element installed, when impelled by a force, preferably along the axis but from either direction, to pull with it the enclosed sheet, thus displacing the container by rotary force over the supporting surface.

9 Claims, 10 Drawing Figures

CONTAINER THAT CAN BE DISPLACED BY ROTARY FORCE

The subject matter of this application is an original receptacle/container of multiple applications, some of which follow:

As a mobile reservoir for transporting water, liquids of varying viscosity, gases, dry goods and suspensions for supplying these materials for irrigation, forest fires, etc., independently of the volume and of the distance to be transported.

Filled with air or a liquid, as a continuous form attached to a vibrocompressor, for the construction of conduits, irrigation ditches, tunnels, etc., made of concrete or other materials. The still wet and newly formed conduit is poured over the container until the conduit hardens. At that time, the container will have finished its passage through the conduit.

The container consists of a surface similar to a non-rigid cylinder that takes the form generated by a rectangle whose two shorter sides have been substituted by convex semi-circumferences of the same diameter as the length of the substituted sides, as it revolves about an axis that extends along one of the longer sides, and has as its nucleus a series of irregular longitudinal folds.

This arrangement, described more graphically, would be the one assumed by a flexible cylindrical surface one of whose edges or openings passed through the inside of the surface itself until reaching the other extremity to which it would be hermetically sealed, then filling the receptacle thus formed with a fluid.

A container such as the one described would be subjected to hydrostatic pressures in all directions whose magnitude would be a function of the unit volume of the fluid introduced. Making use of this pressure, if we introduce a trapped, rigid element into the interior surface of the container and apply a force to it, the container will roll over the supporting surface in the direction of the force applied. The supporting surface can be a plane, a surface enveloping the container, e.g. the inside of a cylinder in contact with the container, or a fluid in which the said container is immersed, understanding this latter disposition of the surface as a variant of the former in which the enclosing supporting surface is not rigid.

The rigid element inserted and to which the force causing the movement is applied can be a chain, a belt, cable, etc., or even a shaft or rigid tube.

As for the arrangement of the components through which this force is transmitted, it could be a pulley or a set of pulleys, with or without tensor elements, the driving unit being a conventional motor and, in some applications, a farm tractor.

Expanding on the foregoing description and solely by way of example, drawings are attached representing:

FIG. 1 — Plan view of a section of the container along the axis of rotation.

FIG. 2 — Section per II—II of FIG. 1.

Figure 3:
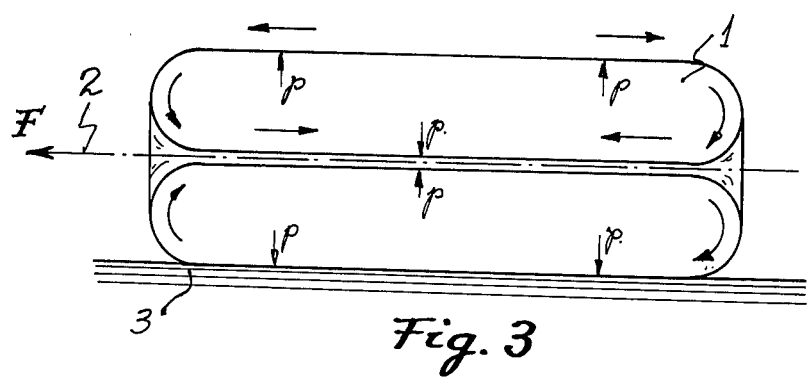

FIG. 3 — Detail of the container incorporating a tensor element (belt, cable with transversal filaments, etc.).

Figure 4:
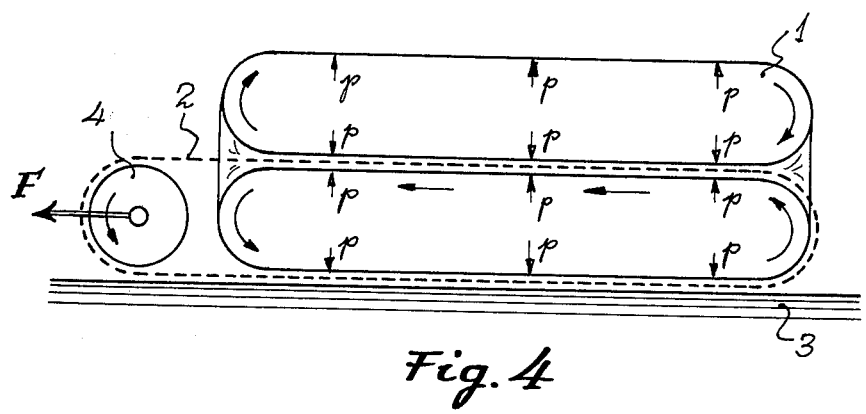

FIG. 4 — Detail of the container with a continuous tensor element as the traction unit connected to a driving pulley.

Figure 5:
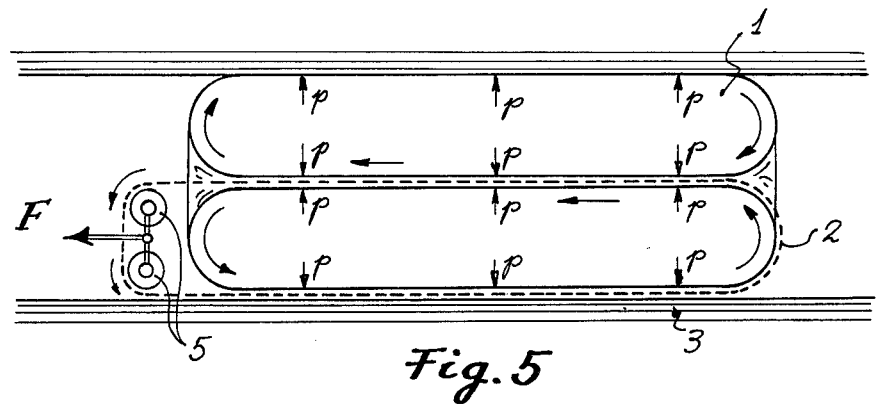

FIG. 5 — The same arrangement with a set of two pulleys.

Figure 6:
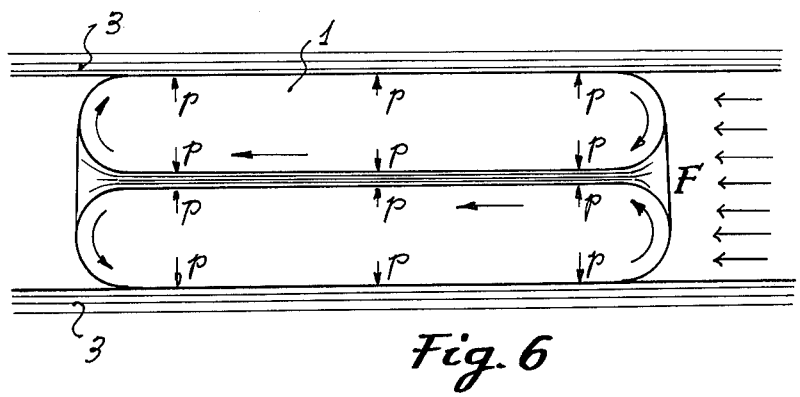

FIG. 6 — Container in the inside of a tube and moved by pressure.

Figure 7:
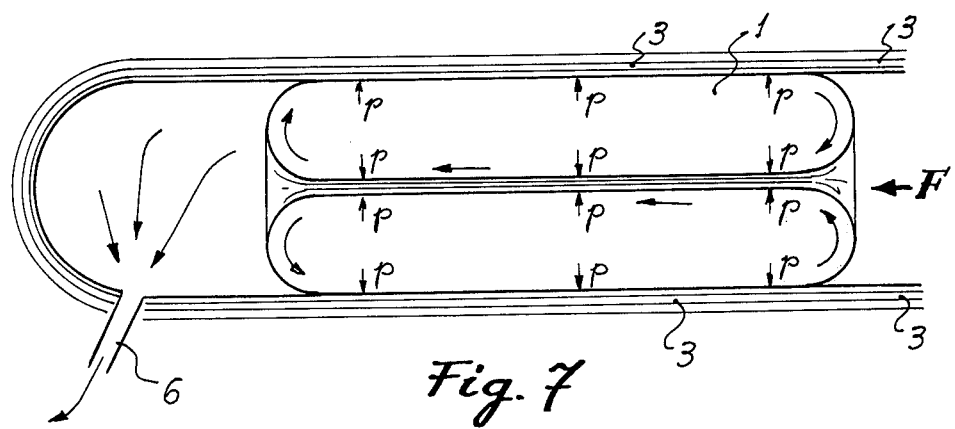

FIG. 7 — Container in the inside of a tube and moved by a vacuum.

Figure 8:
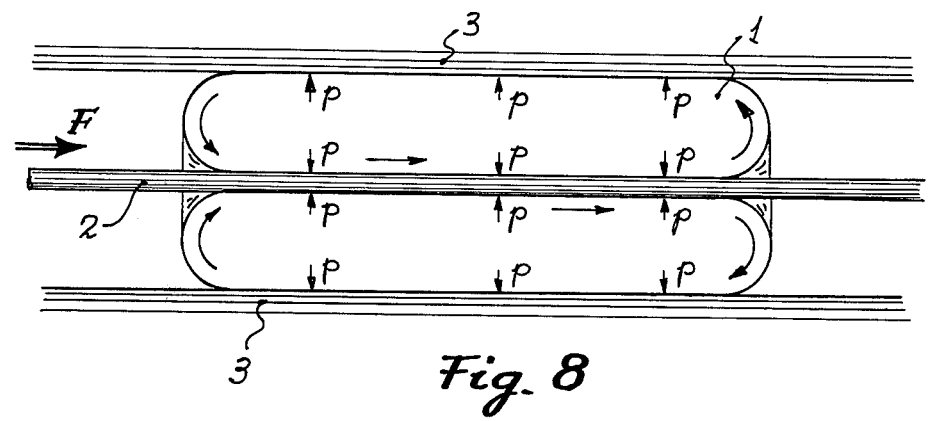

FIG. 8 — Container in the inside of a tube with a shaft as the rigid element.

Figure 9:
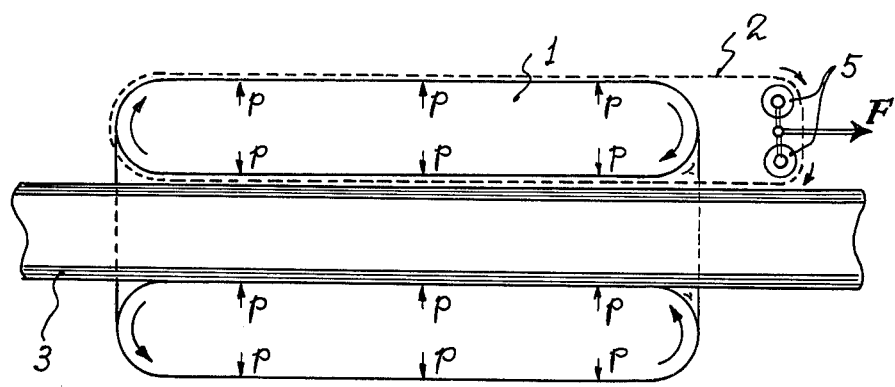

FIG. 9 — Container supported by the outer surface of a tube and with a pair of driving pulleys.

Figure 10:
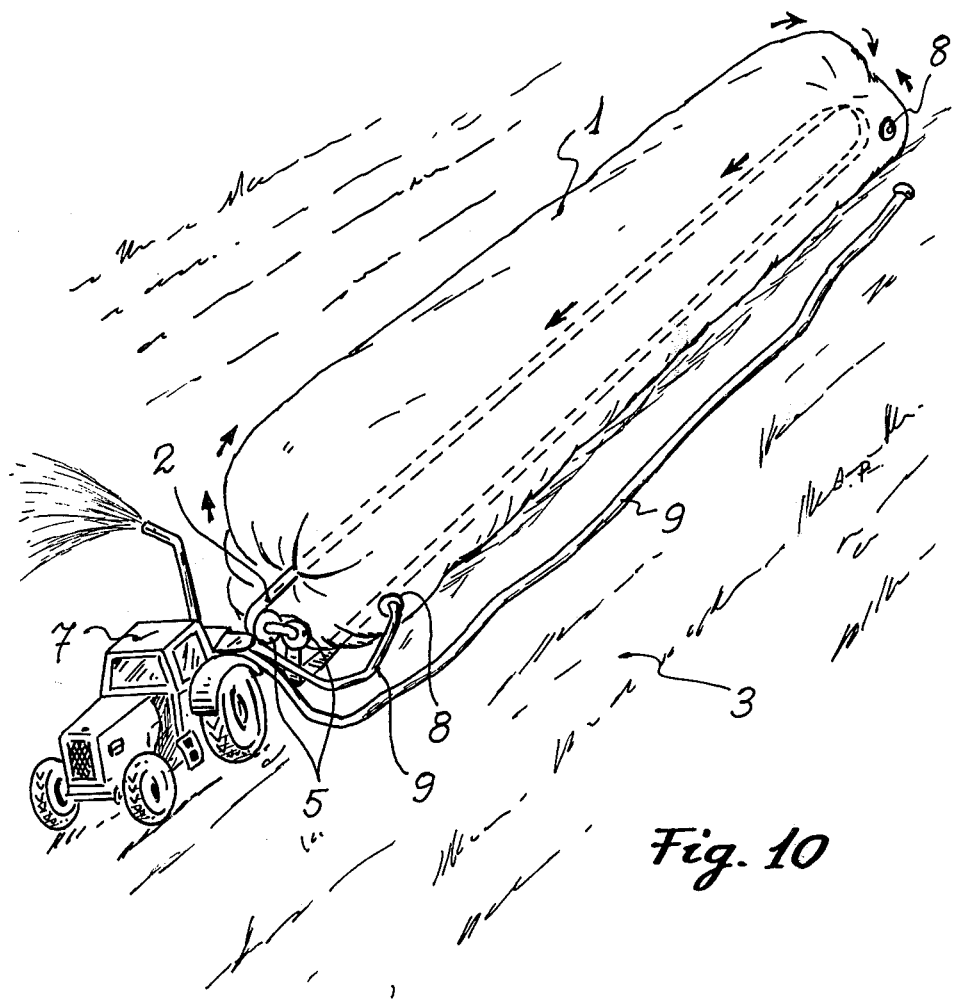

FIG. 10 — View of a container ready to be used for irrigation.

A container such as 1 (FIGS. 1 to 9), is filled with a fluid producing hydrostatic pressures ($p$) in the interior of the container 1 which, in the area surrounding the axis, press against the sheet of which the container 1 is made, with the result that, if we have inserted a rigid element 2 positioned along the axis, this rigid element is compressed by the sheet. If we now exert a force F beginning at one of the points of the said rigid element 2 it is obvious that the successive points of the surface of the container will take up more advanced positions than initially in their progressive contact with the supporting surface 3. That is to say, we will have effected a displacement by rotary motion, of the entire container and, with it, of the material it contains.

Based on this principle, we will be able to utilize the container according to the different applications enumerated above.

The element that applies the force to the nucleus may be a chain (FIGS. 4 and 5), a shaft (FIG. 8), a tube or a belt (FIG. 10), or any other element, which, when submitted to pressure from the walls of the container, is capable of causing the displacement of the said walls.

The supporting surface 3 can be a plane (FIGS. 3 and 4), the inside of a tube (FIGS. 5, 6, 7 and 8), the outside of a tube (FIG. 9), or uneven ground (FIG. 10); it can likewise be a non-rigid surface as in the case of the container 1 submerged in a fluid.

The traction unit may be a pulley 4 (FIG. 4), a set of pulleys 5 (FIGS. 5, 9 and 10) or any other similar arrangement, including pressure exerted on one of the ends of the container 1 located inside a tube (FIG. 6), or atmospheric pressure on one of the sides of the container 1 when a vacuum is created on the other side (FIG. 7), the container 1 being in a tube having an intake 6 to create the necessary vacuum made possible by the plasticity of the container 1 which adjusts hermetically to the inside walls of the tube 3 forming the supporting surface.

In any of the above-mentioned cases, the application of a force F will result in the immediate displacement of the container in the same direction as its longitudinal axis or in the direction imposed by the characteristics of the surface on which it rests. In this manner, we can transport, for its appropriate use, the material with which the said container 1 is filled, the object of such transport being to utilize a supporting surface that is movable at will, applicable to the use of the container 1 as an interior form for the construction of a conduit.

Another application we point out for its importance is one permitting irrigation using the water contained and transported in the container 1 which is pulled by a tractor 7. The container is fitted with valves 8 for the connection of hoses 9 at intervals, so that as the tractor advances sufficiently to cause the hose 9 connected to the valve 8 to be taut, the other valve 8 will be near the tractor 7 and can be connected to the free hose 9 so that the tractor 7 can make another run after which another cycle such as the one described will begin.

It is hereby made a matter of record that the above enumeration is merely illustrative and not limiting; the inventor reserves the right conferred by law to introduce such improvements as usage may warrant, so long as the essential characteristics of the invention are maintained.

What is claimed is:

1. A longitudinally extending flexible container for a voluble material adapted to impart to the material contained therein a rotary motion along the longitudinal axis of the container as said container is moved along an abutting surface; said container being defined by a continuous flexible outer skin adapted to conform to the surface along which the container is moved, said skin having the shape of an elongated torus with its shorter opposite sides assuming a convex annular configuration of semi-circular cross-section surrounding a hole formed along an axis substantially parallel to the longer sides of the skin when the contents are rotated about said axis as the container is moved along the abutting surface, said axis being defined by means interposed in said hole and held in position therein by pressure exerted thereon by the voluble material to cause said skin to be successively turned inside itself and displaced along the abutting surface as a force is applied to said interposed means in the direction of desired movement of the container.

2. A container according to claim 1, in which the voluble contents consist of a fluid exerting a pressure on the skin.

3. A container according to claim 1, in which the surface along which the container is moved is planar.

4. A container according to claim 1, in which the surface along which the container is moved is the interior surface of a tube.

5. A container according to claim 1, in which the surface along which the container is moved is the outside surface of a tube.

6. A container according to claim 1, in which the interposed means defining the axis of rotation comprises a rotatable chain.

7. A container according to claim 1, in which the interposed means defining the rotary axis comprises an endless belt.

8. A container according to claim 1, in which the interposed means defining the rotary axis comprises a rigid bar.

9. A container according to claim 1, in which the skins are provided with outlet valves at spaced distances for alternate connection with irrigation hoses for irrigating a land surface over which the containers move.

* * * * *